US012690578B2

(12) United States Patent
Rubel et al.

(10) Patent No.: US 12,690,578 B2
(45) Date of Patent: **\*Jul. 28, 2026**

(54) INSECT REPELLANT DEVICE WITH SIMULATED FLAME

(71) Applicant: PIC Corporation, Linden, NJ (US)

(72) Inventors: Eric Rubel, Westfield, NJ (US); David L. Lowe, Port Monmouth, NJ (US); Lawrence E. Bradford, Scotch Plains, NJ (US)

(73) Assignee: PIC Corporation, Clark, NJ (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/081,837

(22) Filed: Mar. 17, 2025

(65) Prior Publication Data

US 2025/0204510 A1 Jun. 26, 2025

Related U.S. Application Data

(63) Continuation of application No. 18/637,727, filed on Apr. 17, 2024, now Pat. No. 12,290,061.

(60) Provisional application No. 63/460,196, filed on Apr. 18, 2023.

(51) Int. Cl.
| | |
|---|---|
| *A01M 1/20* | (2006.01) |
| *F21S 8/08* | (2006.01) |
| *F21S 9/03* | (2006.01) |
| *F21S 10/04* | (2006.01) |
| *F21V 21/06* | (2006.01) |
| *F21V 21/08* | (2006.01) |
| *F21V 23/00* | (2015.01) |
| *F21W 131/10* | (2006.01) |
| *F21Y 113/00* | (2016.01) |

(52) U.S. Cl.
CPC .......... *A01M 1/2077* (2013.01); *F21S 8/083* (2013.01); *F21S 9/037* (2013.01); *F21S 10/043* (2013.01); *F21V 23/006* (2013.01); *F21V 21/06* (2013.01); *F21V 21/0824* (2013.01); *F21W 2131/10* (2013.01); *F21Y 2113/00* (2013.01)

(58) Field of Classification Search
CPC ................................. F21S 10/043; A01M 1/20
See application file for complete search history.

(56) References Cited

U.S. PATENT DOCUMENTS

| | | | | |
|---|---|---|---|---|
| 11,002,417 | B2 * | 5/2021 | Rubel ..................... | A01M 1/22 |
| 11,293,610 | B2 * | 4/2022 | Rubel ..................... | F21S 9/037 |
| 2013/0114244 | A1 | 5/2013 | Formico et al. | |
| 2014/0362560 | A1 | 12/2014 | Formico et al. | |
| 2015/0144713 | A1 | 5/2015 | Formico et al. | |
| 2018/0163919 | A1 | 6/2018 | Eckhart | |
| 2018/0325097 | A1 | 11/2018 | Formico et al. | |
| 2018/0343846 | A1 | 12/2018 | Horne | |
| 2019/0257487 | A1 * | 8/2019 | Green, Jr. .............. | F21V 3/061 |

(Continued)

OTHER PUBLICATIONS

International Search Report and Written Opinion dated Jul. 24, 2024, issued in PCT International Application No. PCT/US2024/024937.

(Continued)

*Primary Examiner* — Alexander K Garlen
(74) *Attorney, Agent, or Firm* — Amster, Rothstein & Ebenstein LLP

(57) ABSTRACT

An insect repellant device including a repellant portion and a light portion with a simulated flame and constant light option.

20 Claims, 13 Drawing Sheets

(56) References Cited

U.S. PATENT DOCUMENTS

| 2019/0281810 A1 | 9/2019 | Sinur et al. |
| 2020/0072426 A1* | 3/2020 | Howard ................ F21V 23/003 |
| 2020/0085033 A1 | 3/2020 | Rubel |
| 2020/0240604 A1* | 7/2020 | Patton ................... F21V 3/0625 |
| 2020/0340638 A1 | 10/2020 | Rubel |
| 2021/0148562 A1 | 5/2021 | Sawalski et al. |
| 2021/0247043 A1* | 8/2021 | Patton ................... F21S 10/043 |
| 2021/0254805 A1 | 8/2021 | Green, Jr. et al. |
| 2022/0022442 A1 | 1/2022 | Studer et al. |
| 2022/0163176 A1 | 5/2022 | Rubel |
| 2022/0272961 A1 | 9/2022 | Rubel |

OTHER PUBLICATIONS

International Preliminary Report on Patentability dated Oct. 16, 2025, issued in PCT International Application No. PCT/US2024/024937.

* cited by examiner

INSECT REPELLANT DEVICE WITH SIMULATED FLAME

CROSS-REFERENCE TO RELATED APPLICATIONS

The present application is a continuation of U.S. patent application Ser. No. 18/637,727, filed Apr. 17, 2024, which claims benefit of and priority to U.S. Provisional Patent Application Ser. No. 63/460,196 filed Apr. 18, 2023 entitled INSECT REPELLANT DEVICE WITH SIMULATED FLAME, the entire contents of which are hereby incorporated by reference herein.

BACKGROUND

Field of the Disclosure

The present invention relates to a battery powered insect repellant device including a light element providing a simulated flame or a constant light.

Related

Conventional insect repelling devices typically utilize a chemical repellant and may be a candle or otherwise utilize a flame to vaporize the repellant material to provide an area of vaporized repellant around the device. The use of open flames results both in inconsistent dispersal of repellant as well as the danger of fire. Since many nuisance insects are active at night or in the early evening, conventional devices that utilize a flame provide an advantage in that the use of the flame may also provide light for users to see, however, flames typically provide inconsistent light and typically only provide light over a limited area. In addition, it is not unusual for such flames to blow out in an outdoor setting.

Accordingly, it would be beneficial to provide an insect repellant device that avoids these and other problems.

SUMMARY

It is an object of the present disclosure to provide a battery operated insect repellant device including a light element providing a simulated flame appearance or a constant light source to provide lighting as well as aesthetically pleasing appearance.

An insect repellant device in accordance with an embodiment of the present disclosure includes: a stake configured to be removably inserted into the ground; a post extending upward from the stake; a repellant portion mounted in a top of the post and including an insect repellant and configured to disperse vaporized insect repellant around the insect repellant device; a light portion mounted on top of the repellant portion, the light portion including a plurality of flickering light sources configured to simulate a flame; a control circuit operably connected to the repellant portion and the light portion to control activation of the repellant portion to provide vaporized insect repellant and the plurality of flickering light sources to provide light; and a power source electrically connected to the repellant, portion, the light portion and the control circuit.

In embodiments, the power source is a battery operably connected to one or more of the control circuit, the light portion and the repellant portion.

In embodiments, the repellant portion includes: a repellant housing; a heating element mounted in the repellant housing; an insect repellant cartridge including insect repellant mounted in the repellant housing, the insect repelling cartridge including: a top portion configured to be received in an opening formed in the repellant housing; and a wick extending above the top portion and in contact with the insect repellant, wherein a top of the wick is positioned adjacent to the heating element.

In embodiments, the plurality of flickering light sources include: a first group of flickering light sources that are controlled by the control circuit to turn on and off together; and a second group of flickering light sources that are controlled by the control circuit to dim and brighten together, wherein the second group of flickering light sources are positioned below the first group of flickering light sources.

In embodiments, the light portion includes at least one constant light source configured to provide substantially constant light.

In embodiments, the control circuit is operably connected to the plurality of flickering light sources and the at least one constant light source to activate the flickering light sources to simulate the flame while the constant light source is off.

In embodiments, the control circuit is operably connected to the flickering light sources and the at least one constant light source to activate the constant light source to provide constant light while the plurality of flickering light sources are off.

In embodiments, the power source is electrically connected to the heating element.

In embodiments, the power source is a rechargeable battery.

In embodiments, the insect repellant device includes a solar panel electrically connected to at least one of the power source, the repellant portion and the light portion.

An insect repellant device in accordance with an embodiment of the present disclosure includes: a stand; a post extending upward from the stand; a repellant portion mounted in a top of the post and including an insect repellant and configured to disperse vaporized insect repellant around the insect repellant device; a light portion mounted on top of the repellant portion, the light portion including a plurality of flickering light sources configured to simulate a flame; a control circuit operably connected to the repellant portion and the light portion to control activation of the repellant portion to provide vaporized insect repellant and the plurality of flickering light sources to provide light; and a power source electrically connected to the repellant, portion, the light portion and the control circuit.

In embodiments, the power source is a battery electrically connected to the control circuit, the light portion and the repellant portion.

In embodiments, the plurality of flickering light sources include: a first group of flickering light sources that are controlled by the control circuit to turn on and off together; a second group of flickering light sources that are controlled by the control circuit to dim and brighten together, wherein the second group of flickering light sources are positioned below the first group of flickering light sources.

In embodiments, the light portion further comprises at least one constant light source configured to provide substantially constant light.

In embodiments, the control circuit is operably connected to the plurality of flickering light sources and the at least one constant light source to activate the flickering light sources to simulate the flame while the constant light source is off.

In embodiments, the control circuit is operably connected to the flickering light sources and the at least one constant light source to activate the constant light source to provide constant light while the plurality of flickering light sources are off.

In embodiments, the repellant portion includes: a repellant housing; a heating element mounted in the repellant housing; an insect repellant cartridge including insect repellant mounted in the repellant housing, the insect repelling cartridge including: a top portion configured to be received in an opening formed in the repellant housing; and a wick extending above the top portion and in contact with the insect repellant, wherein a top of the wick is positioned adjacent to the heating element.

In embodiments, the power source is a rechargeable battery.

An insect repellant device in accordance with an embodiment of the present disclosure includes: a deck clip; a post extending upward from the deck clip; a repellant portion mounted in a top of the post and including an insect repellent and configured to disperse vaporized insect repellant around the insect repellant device; a light portion mounted on top of the repellant portion, the light portion including a plurality of flickering light sources configured to simulate a flame; and a control circuit operably connected to the repellant portion and the light portion to control activation of the repellant portion to provide vaporized insect repellant and the plurality of flickering light sources to provide light; and a power source electrically connected to the repellant, portion, the light portion and the control circuit.

In embodiments, the power source is a battery operably connected to one or more of the control circuit, the light portion and the repellant portion.

BRIEF DESCRIPTION OF THE DRAWINGS

The above and related objects, features and advantages of the present disclosure will be more fully understood by reference to the following, detailed description of the preferred, albeit illustrative, embodiments of the present invention when taken in conjunction with the accompanying figures, wherein.

DETAILED DESCRIPTION OF THE EXEMPLARY EMBODIMENTS

Figure 1:
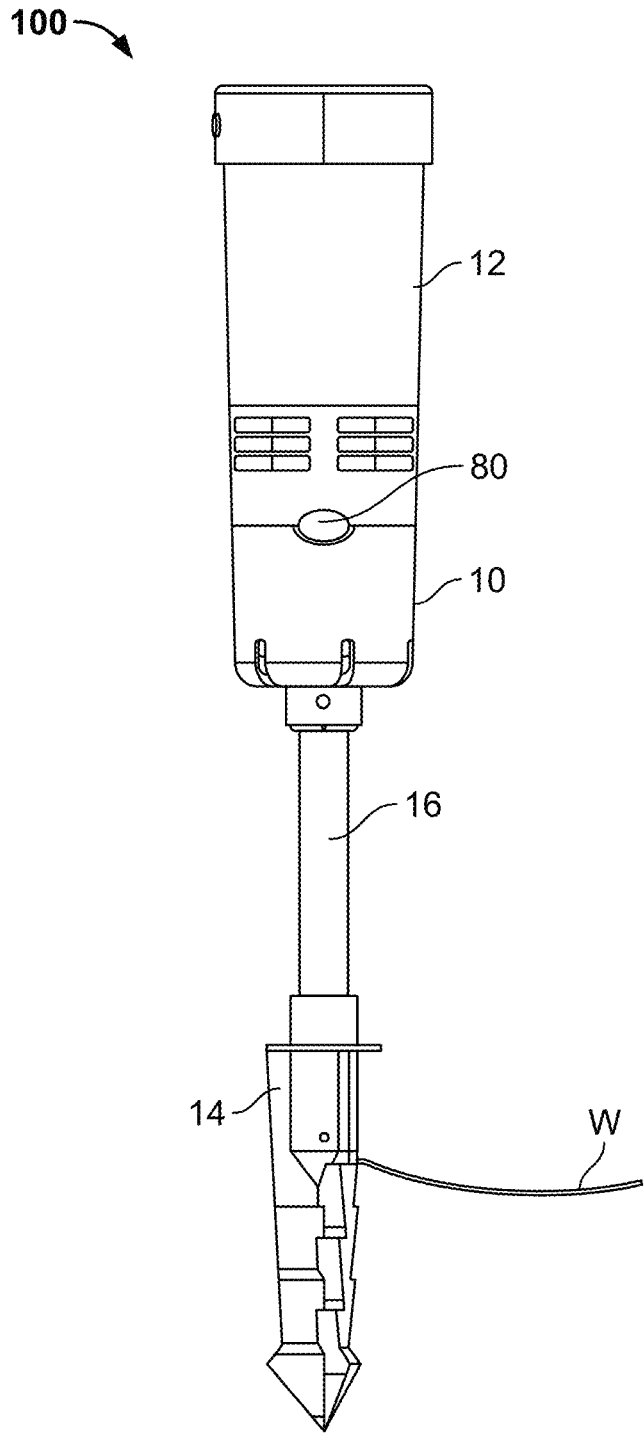
FIG. 1 illustrates a front perspective view of an electric insect eliminator in accordance with an embodiment of the present disclosure.

An insect repellant device 100 in accordance with an embodiment of the present disclosure is illustrated in FIGS. 1-9. In embodiments, the insect repellant device 100 may include a repellant portion 10 and a light portion 12. In embodiments, the repellant portion 10 and the light portion 12 may be mounted on a stake 14 (see FIG. 3, for example) that may be configured for insertion into the ground. In embodiments, the stake 14 may be configured to be removably inserted into the ground to allow for repositioning of the device 100. In embodiments, the stake 14 may include a wire guide or channel that may be used to receive a wire W (see FIG. 1) to provide power to the device 100. In embodiments, a post 16 may extend upward from the stake 14 and the repellant portion 10 and light portion 12 may be mounted on top of the post 16. In embodiments, the wire W may be received in the stake 14. In embodiments, a conduit or other channel may be provided to receive the wire W and pass it through the stake 14. In embodiments, the wire W may extend upward through a hollow central passage in the post 16 to provide power to the repellant portion 10 and the light portion 12. In embodiments, the wire W may provide a low voltage to the repellant portion 10 and the light portion 12, typically about 12V. In embodiments, the wire W may provide other voltages.

Figures 1A, 1B:
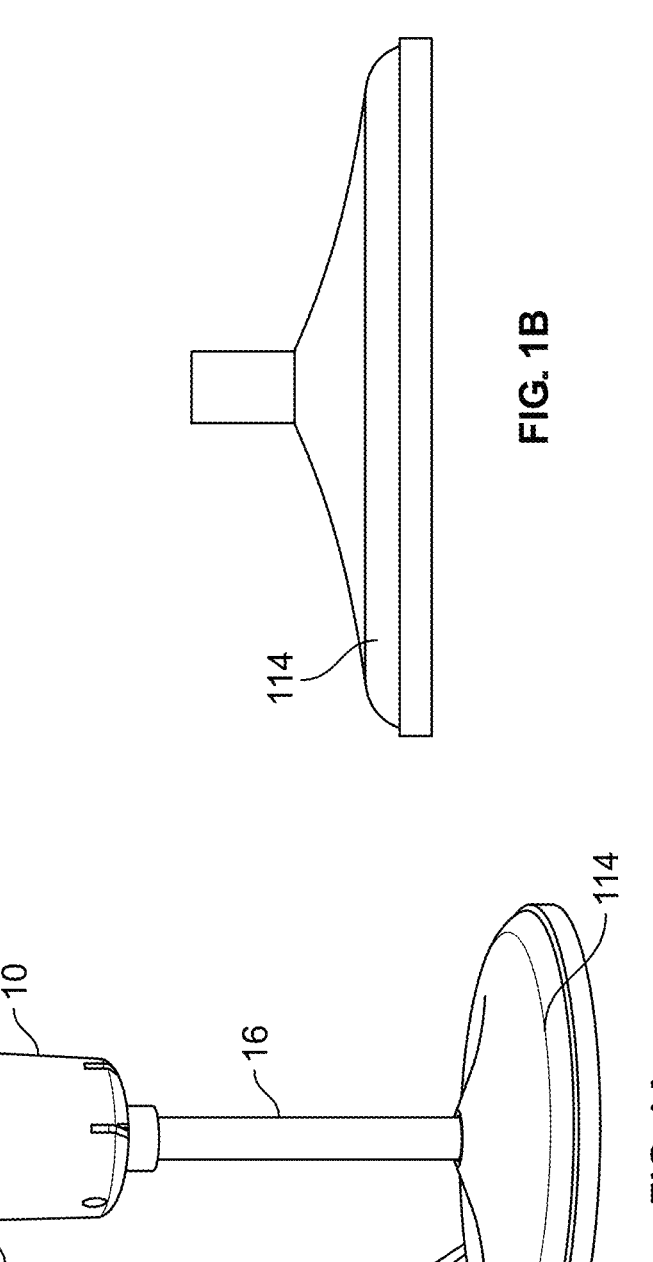
FIG. 1A illustrates a front perspective view of an electric insect eliminator in accordance with another embodiment of the present disclosure.
FIG. 1B illustrates a more detailed view of a stand used in the electric insect eliminator of FIG. 1A.
Figure 1D:
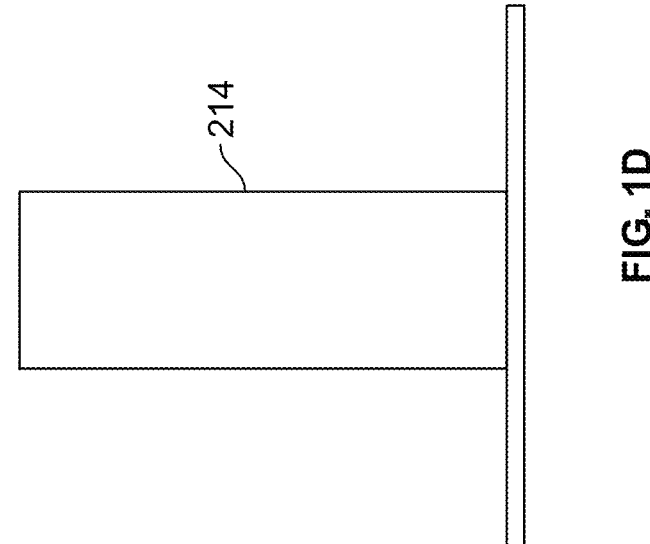
FIG. 1D illustrates a more detailed view of a deck clip used in the electric insect eliminator of FIG. 1C.
Figure 1C:
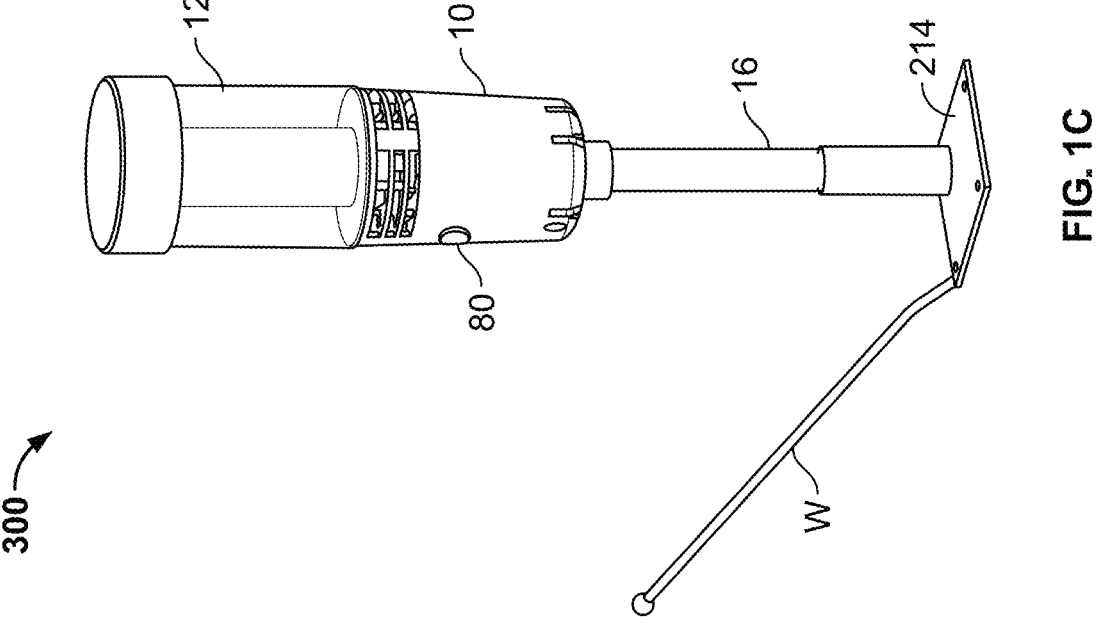
FIG. 1C illustrates a front perspective view of an electric insect eliminator in accordance with another embodiment of the present disclosure.

In embodiments, the stake 14 may not be used and the repellant portion 10 and the light portion 12 may be mounted on a stand 114 (see FIGS. 1A and 1B, for example) or in a base that may be positioned as desired on virtually any surface. In embodiments, where a repellant device 100 uses a stand 114 (see FIGS. 1A and 1B, for example), the repellant portion 10 and the light portion 12 may be mounted in or on the stand. In embodiments, the wire W may pass through the stand 114 as generally indicated in FIG. 1B and the stand may replace the stake 14. In embodiments, the repellant portion 10 and the light portion 12 may be mounted in or on a deck clip 214 (see FIGS. 1C and 1D, for example). In embodiments, where the repellant device 200 uses a deck clip 214, the wire W may pass through the desk clip 214 as generally indicated in FIG. 1C and the desk clip may replace the stake 14.

Figure 3:
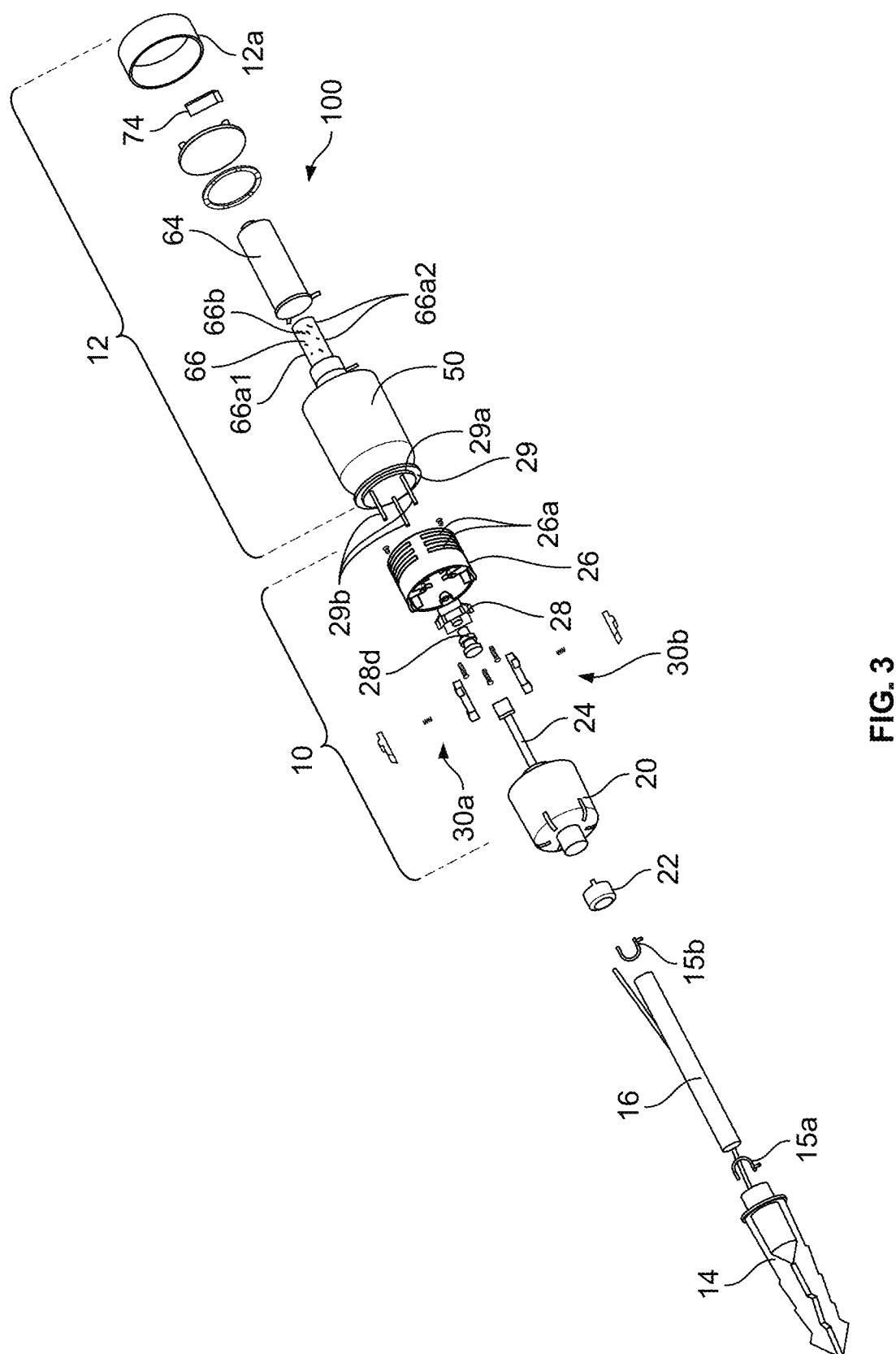
FIG. 3 illustrates an exploded view of the electric insect eliminator of FIGS. 1-2 in accordance with an embodiment of the present disclosure.
Figure 4:
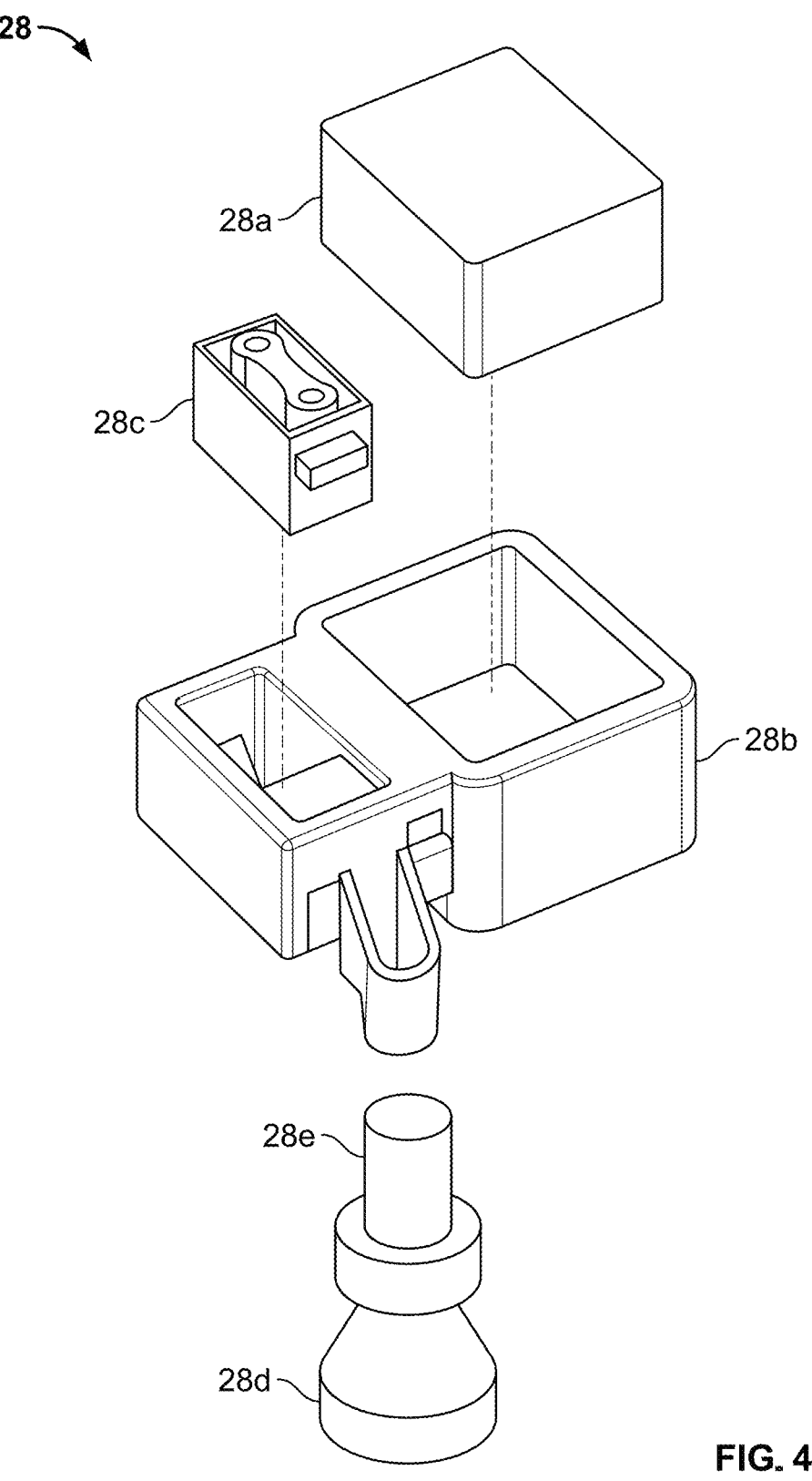
FIG. 4 illustrates a more detailed view of a heating assembly used in the insect repellant device of FIGS. 1-3 in accordance with an embodiment of the present disclosure.
Figure 5:
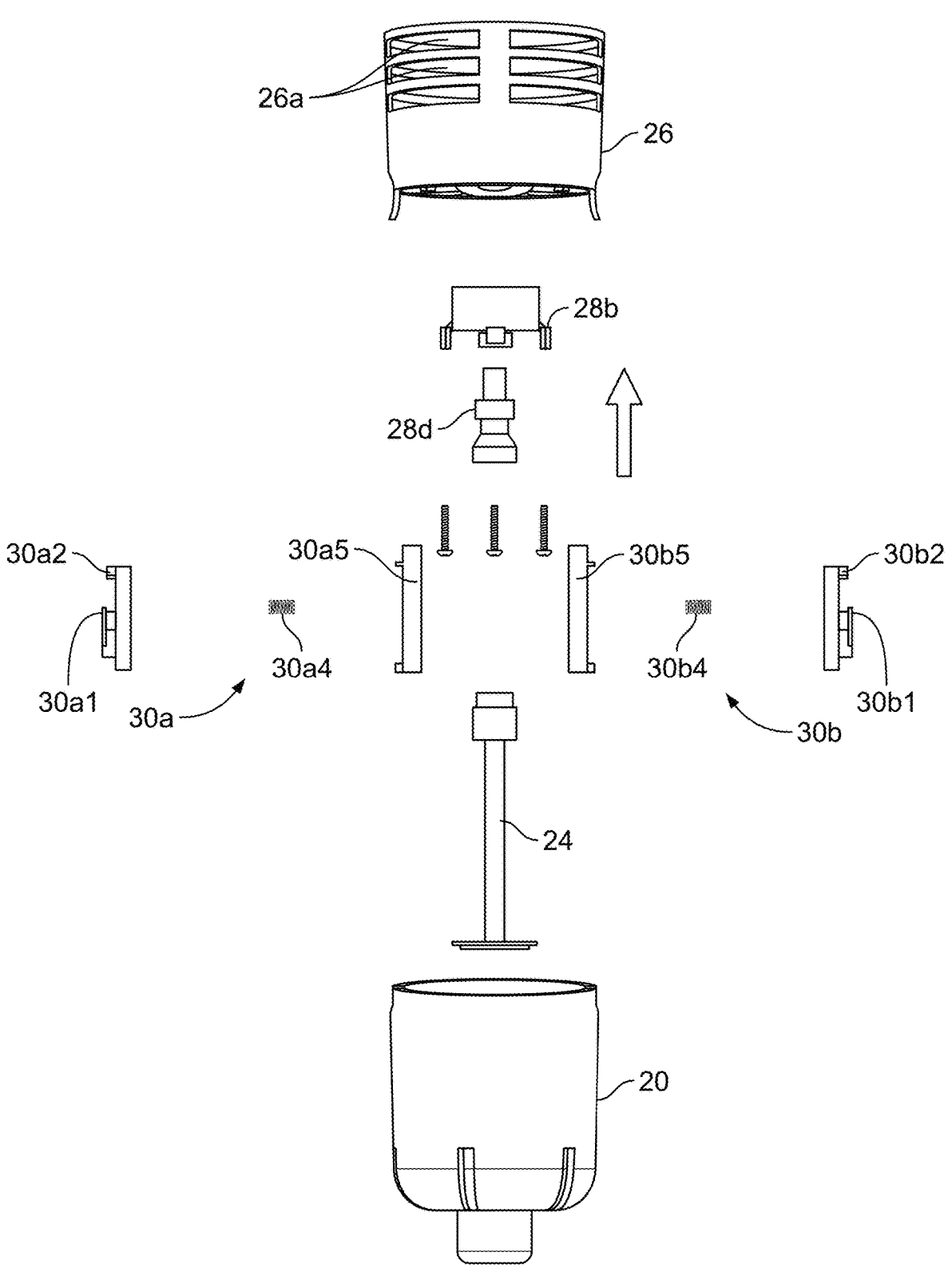
FIG. 5 illustrates a more detailed view of the repellant portion of the insect repellant device of FIGS. 1-3 in accordance with an embodiment of the present disclosure.
Figure 6:
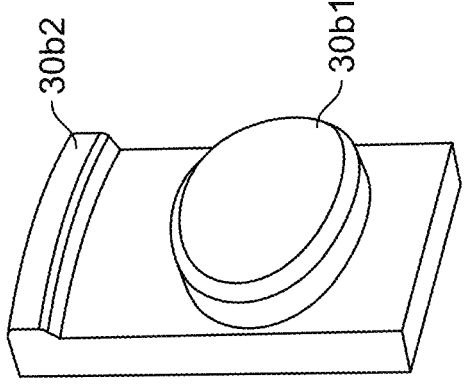
FIG. 6 illustrates a more detailed view of a release button for a repellant cartridge used in the insect repellant device of FIGS. 1-3 in accordance with an embodiment of the present disclosure.
Figure 6:
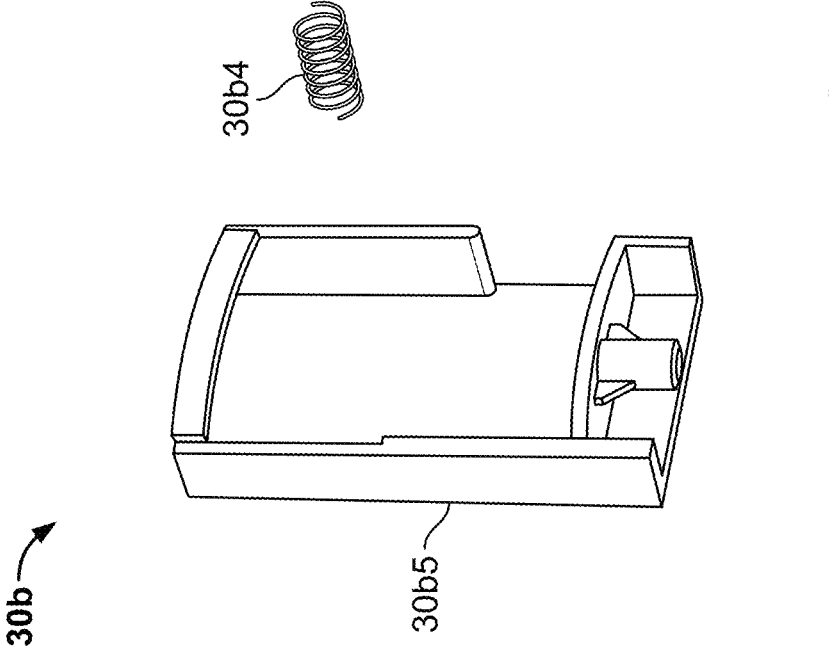

In embodiments, the stake 14 may be connected to the post 16 via a first spring lock 15a to allow for releasably securing the stake 14 to the post 16. In embodiments, the post 16 may be attached to a base 20 of the repellant portion 10 via a second spring lock 15*b*. While FIG. 3 illustrates the spring locks 15*a*, 15*b*, other securing devices may be used to connect the stake 14 to the post 16 and the post to the base 20, including but not limited to threads, screws, or a frictional connection, to name a few.

In embodiments, a cover 22 may be provided around the spring lock 15*b* connecting the post 16 and the base 20. In embodiments, another cover may be provided around the spring lock 15*a*, if desired. In embodiments, the cover 22 may not be provided.

In embodiments, a wire guide 24 may be mounted in the base 20 and the wire W may extend through the wire guide 24. In embodiments, the wire guide 24 may be made of plastic or any electrically nonconducting material. In embodiments, a repellant housing 26 may be mounted on top of the base 20. In embodiments, the repellant housing 26 may include a plurality of vent openings 26*a* formed in a sidewall thereof. In embodiments, the vent openings 26*a* are sized to allow vaporized insect repellant material to exit the repellant housing 26 while preventing users from reaching inside the housing 26. In embodiments, the vent openings 26*a* may be 0.13 inches apart, however, this distance may be larger or smaller.

Figure 2:
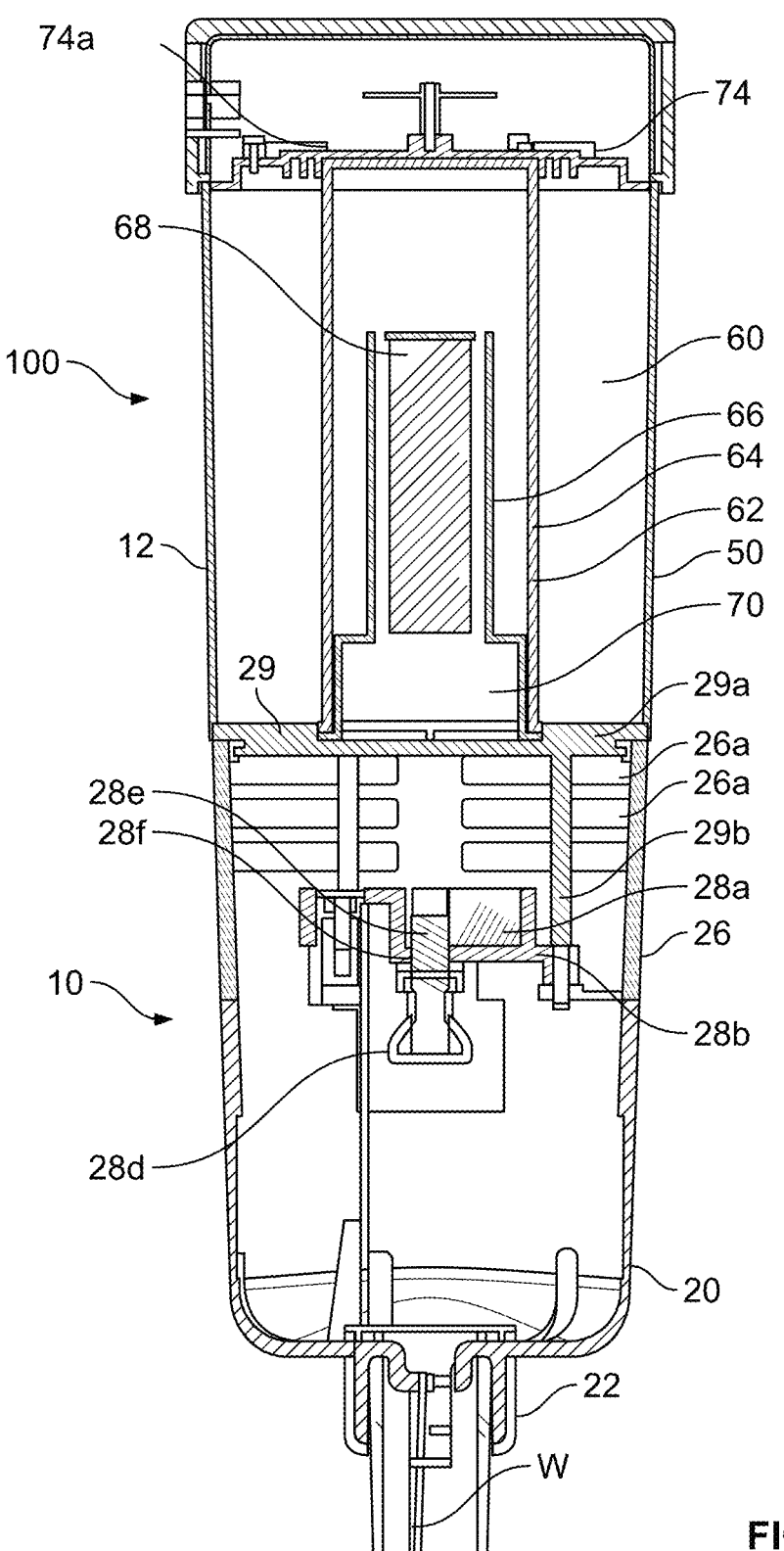
FIG. 2 illustrates a cross-sectional view of an insect repellant device with a simulated flame light source in accordance with an embodiment of the present disclosure.

In embodiments, a heating assembly 28 may be mounted in the repellant housing 26. In embodiments, the heating assembly 28 may include a heating element 28*a* mounted in a heating housing 28*b* of the heating assembly 28. In embodiments, the heating element 28*a* may be a ceramic heating element. In embodiments, ceramic heating elements offer certain benefits including quick heating, a high heat to size ratio and high energy efficiency. In embodiments, any suitable heating element may be used including an etched foil heater, a band heater, or a tubular heater, to name a few. In embodiments, a power terminal 28*c* may be provided in the heating housing 28*b* and may be electrically connected to the heating element 28*a*. In embodiments, the power terminal 28*c* may be electrically connected to the heating element 28*a* such that the heating element 28*a* generates heat. In embodiments, the power terminal 28*c* may be electrically connected to the wire W and provides power to the heating element 28*a*. In embodiments, a repellant cartridge 28*d* may be mounted in the heating housing 28*b*. In embodiments, the repellant cartridge 28*d* may hold insect repellant. In embodiments, a wick 28*e* may extend from a top of the cartridge 28*d* and may be positioned adjacent to the heating element 28*a* when the repellant cartridge 28*d* is mounted in the housing 28*b*. In embodiments, the repellant cartridge 28*d* may be removably mounted in the housing 28*b*. In embodiments, the cartridge 28*d* may be screwed into the housing 28*b*. In embodiments, the housing 28*b* may include an opening 28*f* configured to receive at least a top portion of the cartridge 28*d* such that the wick 28*e* is positioned adjacent to the heating element 28*a* when the top portion of the cartridge 28*d* is positioned in the opening 28*f* as can be seen in FIG. 2 for example. In embodiments, the cartridge 28*d* may be secured to the housing 28*b* is any desired manner. In embodiments, the insect repellant may be metofluthrin, however any suitable insect repellant may be used including transfluthrin or essential oils, to name a few. In embodiments, the wick 28*e* may draw repellant up out of the top of the cartridge 28*a* adjacent to the heating element 28*a* where heat from the heating element 28*a* vaporizes the repellant. The vaporized repellant may flow out through the openings 26*a* into the area around the repellant device 100 to create an insect free area around the device 100.

In embodiments, a heating assembly top 29 may be provided above the heating assembly 28. In embodiments, the heating assembly top 29 may include a top disk 29*a* with a plurality of legs 29*b* extending downward therefrom spacing the disk 29*a* from the housing 28*b* to provide a space for vaporized repellant to fill prior to exiting through the openings 26*a*.

Figure 7:
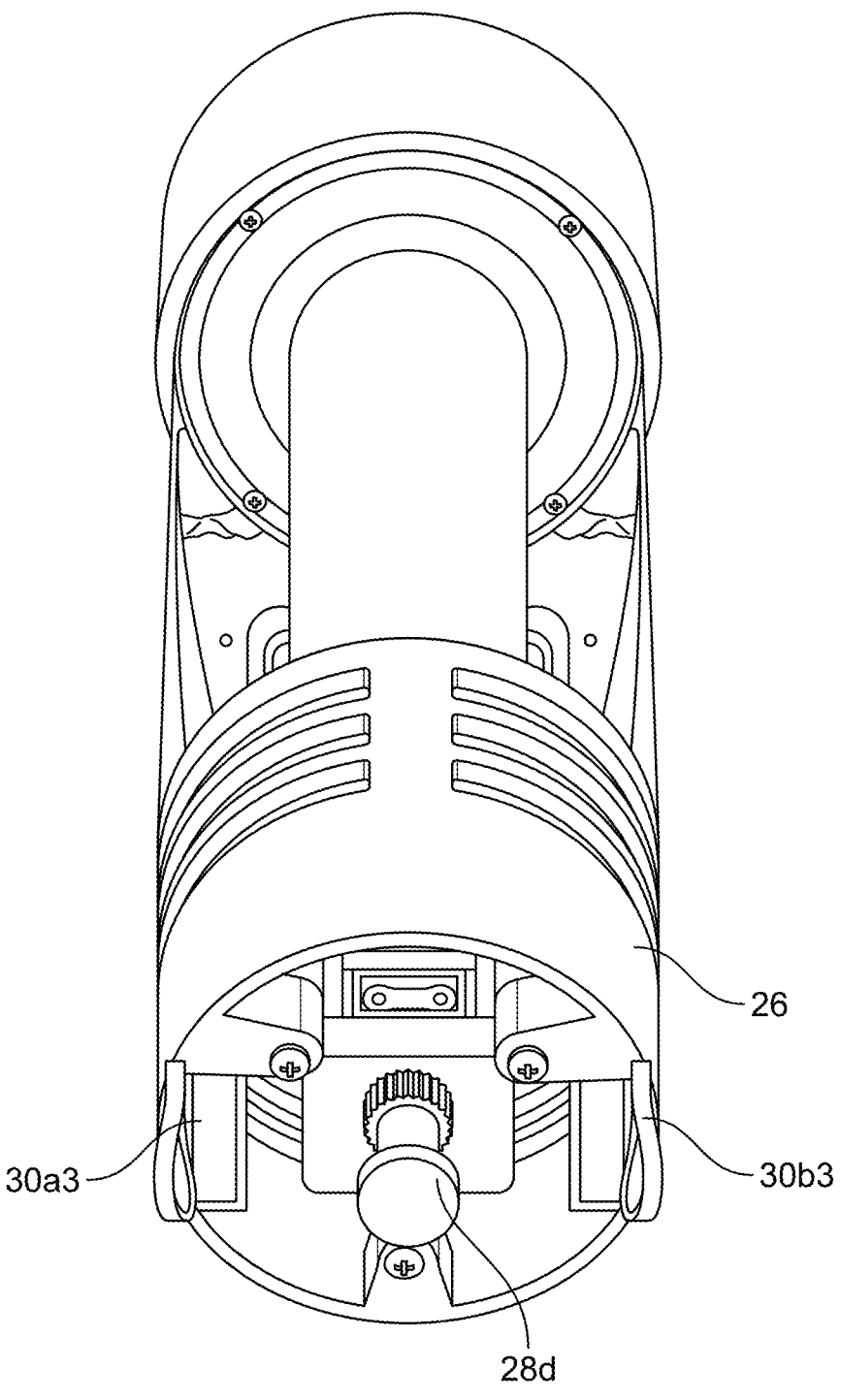
FIG. 7 illustrates a view of a light portion of the insect repellant device of FIGS. 1-3 separated from the light portion in accordance with an embodiment of the present disclosure.
Figure 8:
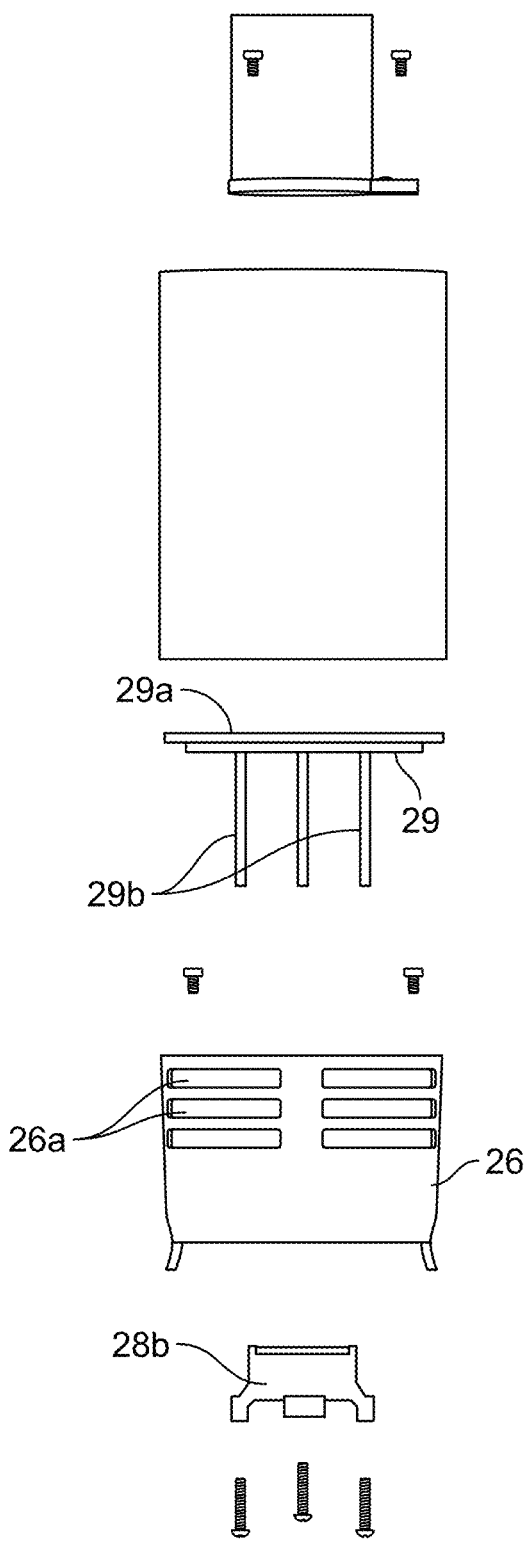
FIG. 8 illustrates a more detailed view of the light portion and the housing of the repellant portion used in the insect repellant device of FIGS. 1-3 in accordance with an embodiment of the present disclosure.

In embodiments, the repellant housing 26 may be separated from the base 20 to allow access to the cartridge 28*d* as illustrated in FIG. 7, for example. In embodiments, the housing 26 may be separated from the base 20 such that the cartridge 28*d* can be removed and replaced in the heating element housing 28*b*. In embodiments, a pair of release elements 30*a*, 30*b* may be provided in the base 20 to releasably connect the base to the housing 26. In embodiments, each of the release elements 30*a*, 30*b* may include a button 30*a*1, 30*b*1 mounted in a respective casing 30*a*5, 30*b*5 (see FIG. 6, for example) in the base 20 that may be pushed inward to move a corresponding protrusion 30*a*2, 30*b*2 inward. The protrusions 30*a*2, 30*b*2 may be received in respective slots 30*a*3, 30*b*3 formed in the housing 26 to secure the base 20 to the housing 26 when the protrusions 30*a*2, 30*b*2 are in the slots 30*a*3, 30*b*3 and release the base from the housing when the protrusions are pushed inward. In embodiments, a respective biasing spring 30*a*4, 30*b*4 biases the buttons 30*a*1, 30*b*1 and protrusions 30*a*2, 30*b*2 outward and into the slots 30*a*3, 30*b*3 to hold the housing 26 on the base 20. When a user pushes the buttons 30*a*1, 30*b*1 inward, the protrusions 30*a*2 and 30*b*2 are removed from the slots 30*a*3, 30*a*3 to allow the housing 26 to be removed from the base 20. Once removed, the cartridge 28*d* may be removed from the repellant housing 28*b* and replaced with a new cartridge, if desired.

In embodiments, the light portion 12 may be mounted on top of the repellant portion 10. In embodiments, a screen element 50, may be mounted on top of the housing 26 and extend around a periphery of the light portion 12. In embodiments, the screen element 50 may be substantially transparent. In embodiments, the screen element 50 may be substantially waterproof, or water resistance and may be used to protect the light emitting assembly 60 provided inside the screen element 50.

In embodiments, the light emitting assembly 60 may include a cylindrical shade 62 surrounding a light emitting element 64. In embodiments, the light emitting element 64 may include a plurality of light sources 66A1, 66A2 which may be mounted on a flexible printed circuit board 66. In embodiments, the board 66 may be mounted on a support 70. In embodiments, the light sources are LEDs 66A1, 66A2 that emit light through the shade 62 which may be tinted or colored to provide the impression of a flame. In embodiments, one or more of the LEDs 66A1, 66A2 may be a different color in order to provide the impression of a flame. In embodiments, the LEDs 66A1 belong to a first group and the LEDs 66A2 belong to a second group. In embodiments, the first group of the LEDs 66A1 may be driven to blink on and off together. In embodiments, the second group of LEDs 66A2 may be driven to brighten and dim in intensity together. In embodiments, the second group of LEDs 66A2 may be positioned below the first group of LEDs 66A1 or vice versa. In embodiments, one or more of the light emitting diodes in the first group of LEDs 66A1 or the second group 66A2 may be of different colors. The combination of the two groups of LEDs, when viewed through the shade 62, which may be tinted or colored as noted above, if desired, provides the impression of a flickering flame behind the screen 50. In embodiments, the shade 62 may be of any desired shape provided that it fits within the screen 50. In embodiments, while LEDs are preferred, other light sources may be used.

In embodiments, the light emitting assembly 60 may also provide constant, that is, non-flickering light. In embodiments, the circuit board 66 may include additional constant light sources 66B that may be used to provide a constant light rather than the flickering effect discussed above. In embodiments, the light sources 66B may be of the same color and evenly spaced around the substrate 42. In embodiments, the light sources 66B may be activated together and remain on at the same time to provide for a constant light that does not flicker. In embodiments, the light sources 66B may be white light LEDs. In embodiments, when the light sources 66B are activated, the light sources 66A1, 66A2 are not activated such that the light portion 60 may operate in a constant light mode or a flickering mode. In embodiments, the LEDs 66A1, 66A2 may be used to provide constant light by simply being operated in an alternate state in which they do not blink on and off or dim. In embodiments, where the LEDs 66A1, 66A2 may be used to provide constant light, it may not be necessary to provide the light sources 66B. In embodiments, the flexible circuit board 66 may include additional constant light sources, for example, white light LEDs that may be operated to provide constant light, without flickering, if desired. In embodiments, one or more of the LEDs in the first group of LEDs 66A1 and/or the second group of LEDs 66A2 may be operated in a constant manner to provide constant light without flickering.

In embodiments, a circuit board 74 (see FIG. 1 or 3, for example) may be provided to hold or provide control circuitry, or control circuit, 74a for the lighting portion 60 and the repellant portion 10. In embodiments, a power source 68, which may be a battery, may be operatively connected to the PCB 74 and used to power the repellant portion 10 and the light portion 12. In embodiments, an external transformer may be used to provide power via the wire W, which may be operatively connected to the power source 68. In embodiments, the power source 68 may be provided on the circuit board 74. In embodiments, the control circuitry 74a may be provided elsewhere and need not be mounted on the circuit board 74. In embodiments, the power source 68 may be mounted on the base 70 as indicated in FIG. 2, for example. In embodiments, the power source 68 may be a rechargeable battery. In embodiments, the power source 68 may be recharged via a line voltage, if desired via a USB, wireless or other connection or via the wire W. In embodiments, the battery may be recharged via any other suitable power source. The power source 68 may be any suitable power source. In embodiments, the power source 68 may be a transformer or transformers that may be used to provide one or more desired voltages to the light portion 12 and repellant portion 10 from the voltage provided via the wire W. In embodiments, the power source 68 may be operatively connected to the power terminal 28c to provide power and/or for connection to the wire W. In embodiments, the power source 68 may be a transformer connected to the wire W to convert the voltage provided by the wire W to a desired voltage suitable for use with the repellant portion 10 and the light portion 12.

In embodiments, the control circuitry 74a may include an LED boost circuit used to drive the LEDs 66A1, 66A2 and/or LEDs 66B as well. In embodiments, other driving circuitry may be provided to drive the LEDs 66A1, 66A2 and 66B. As noted above, the two groups of LEDs 66A1, 66A2 are preferably driven in a particular sequence to simulate a flame while the LEDs 66B may be driven to provide constant light. In embodiments, the control circuitry 74a may include circuitry to control the repellant portion 10, and specifically the activation of the heating element 28a.

In embodiments, the base 70 of the light element 60 may be mounted on or connected to the heating assembly top 29, and specifically the disk portion 29a, thereof. In embodiments, the circuit board 74 may be mounted in or under a top element 12a of the light portion 12. In embodiments, the top element 12a may be mounted in top of the screen 50.

In embodiments, an input device 80 (see FIG. 1) such as a power button or switch may be operable to activate the light portion 12 and/or the repellant portion 10. That is, in embodiments, the light portion 12 may be activated without activating the repellant portion 10. In embodiments, the input device 80 may activate the repellant portion 10 and not the light portion 12. In embodiments, the repellant portion 10 and the light portion 60 may be activated at the same time. In embodiments, the light portion 12 may be activated without the repellant portion 10. In embodiments, the additional LEDs 66B or other light sources may be used to provide for a constant light rather than flickering and may also be controlled by input from the input device 80. In embodiments, these constant light sources 66B may be activated with or without activation of the repellant portion 10. In embodiments, other input devices, other than A power button, may be used to provide input to control the repellant portion 10 and the light portion 12 including the flickering LEDs 66A1, 66A2 and the constant light sources 66B. In embodiments, a light sensor may provide information regarding ambient light levels around the repellant device 100. In embodiments, the light sensor may be provided on or integrated with a transformer, which may be provided externally or in the base 20, as desired. In embodiments, the repellant device 100 may be activated when the ambient light level drops below a threshold level and may turn off when the light level rises above the threshold. In embodiments, the repellant device 100 may be activated such that the light portion 12 is activated to provide either the simulated flame light or the constant light when the ambient light level drops below the threshold level. In embodiments, the repellant portion 10 may be activated to vaporize repellant with or without the flickering LEDs 66A1, 55A2 or the constant light sources 66B activated based on the ambient light level. In embodiments, the light sensor may be a photocell, however, any suitable light sensor device may be used. In embodiments, the light sensor may be provided at any desired portion on the repellant device 100 or as part of a control system operatively connected to the device.

Figure 9:
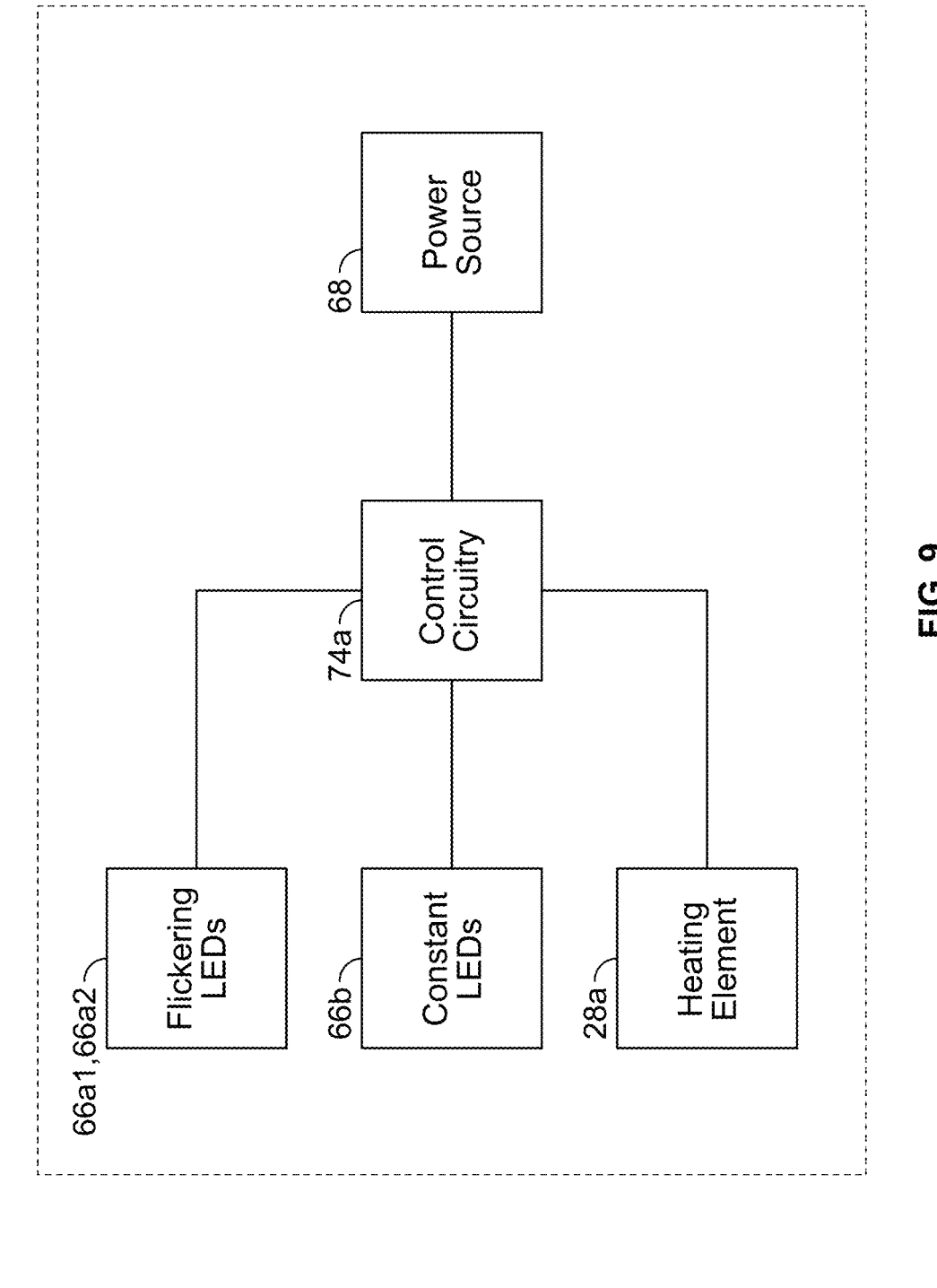
FIG. 9 illustrates an exemplary block diagram of the insect repellant device of FIGS. 1-3 in accordance with an embodiment of the present disclosure.

FIG. 9 illustrates an exemplary block diagram of the repellant device 100. In embodiments, the power source 68 may provide power to the heating element 28a, the flickering LEDs 66A1, 66A2 and LEDs 66B as well as the control circuit 74a. The control circuitry, or control circuit, 74a, which may be provided on the PCB 74 and may be or include the boost circuit, and/or other circuitry, may drive the flickering LEDs 66A1, 66A2 and LEDs 66B. The control circuitry 74a may also control activation of the repellant portion 10, specifically activation of the heating element 28a to vaporize insect repellant. As noted above, the flickering LEDs 66A1, 66A2 may be driven in respective patterns to simulate the appearance of a flickering flame and the LEDs 66B may be activated to provide constant light when desired. In embodiments, the control circuitry 74a may be connected to the input device 80 such as a power button and may drive the repellant portion 10, the flickering LEDs 66A1, 66A2 or constant light LEDs 66B based on input provided by the input device 80. In embodiments, separate control circuitry may be provided and connected to the power button 80 to control the repellant portion 10, the flickering LEDs 66A1, 66A2 and LEDs 66B. In embodiments, the light level information provided by the light sensor may be provided to the control circuitry 74a. In embodiments, the control circuitry 74a may include a processor, microprocessor or other control element or component to provide for control of the repellant portion 10, the flickering LEDs 66A1, 66A2 and LEDs 66B. In embodiments, control of the repellant portion 10, the flickering LEDs 66A1, 66A2 and LEDs 66B may be based on both input from the power button 80 and the light sensor. In embodiments, the power button 80 may be pressed once, or placed in a first position, to enter a light monitoring mode in which power is provided to one or more of the repellant portion 10, the flickering LEDs 66A1, 66A2 and LEDs 66B when the light information indicates a light level below a threshold based on input form the sensor. In embodiments, one or more of the repellant portion 10, the flickering LEDs 66A1, 66A2 and LEDs 66B may be deactivated when the light level rises above the threshold. In embodiments, pushing the button 80 again, or putting it in a second position, may directly activate one or more of the repellant portion 10, the flickering LEDs 66A1, 66A2 and LEDs 66B without consideration of the light level information. In embodiments, as noted above, each of the repellant portion 10, the flickering LEDs 66A1, 66A2 and LEDs 66B may be activated independently, if desired, based on operation of, or the position of, the power button 80 and/or light level information provided by the light sensor. In embodiments, as noted above, other input elements may provide information to control the repellant portion 10, the flickering LEDs 66A1, 66A2 and LEDs 66B. In embodiments, the repellant device 100 may be placed in an off mode in which all of the repellant portion 10, the flickering LEDs 66A1, 66A2 and LEDs 66B are deactivated and stay that way regardless of light sensor information until activation of the power button 80 or another input.

Figure 10:
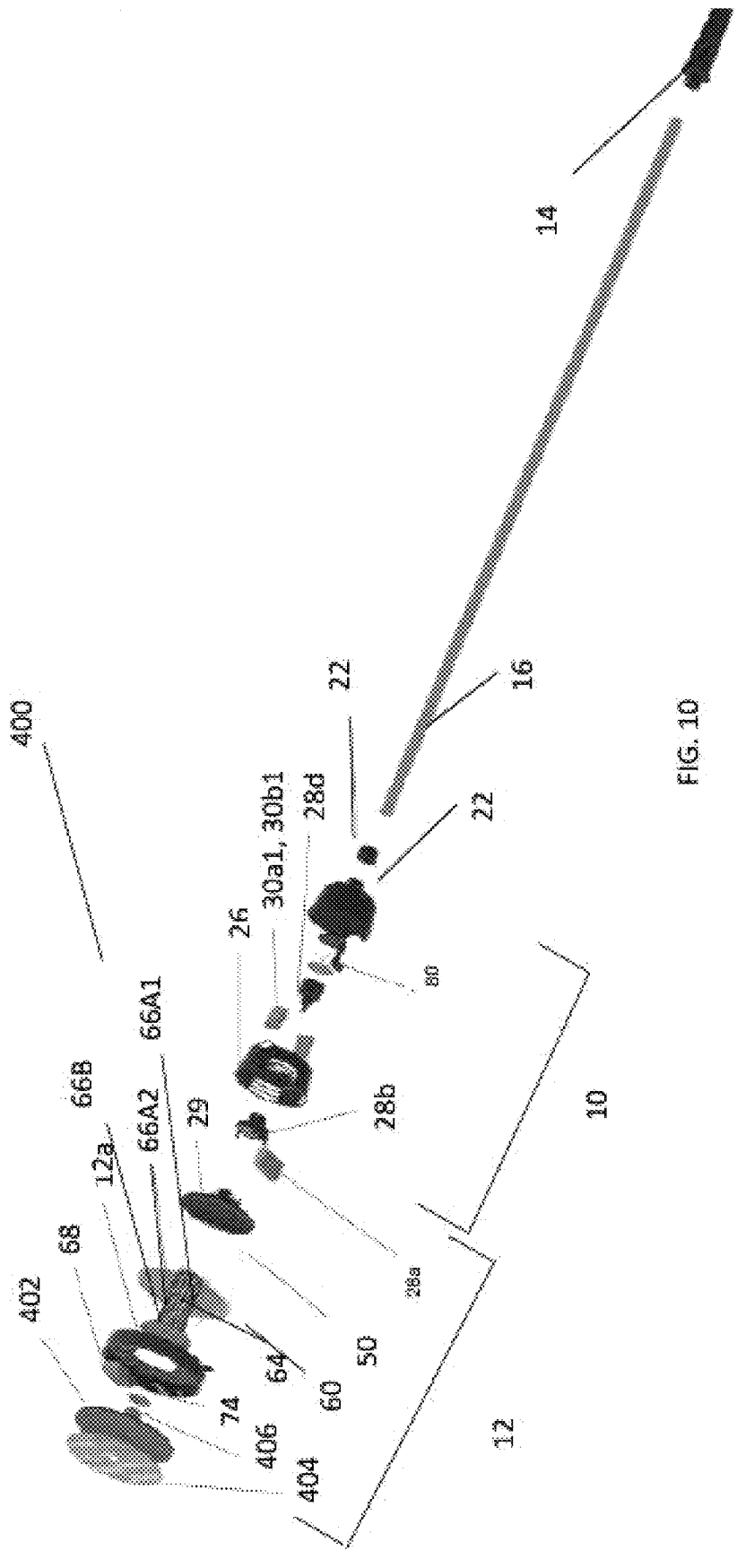
FIG. 10 illustrates an exploded view of an insect repellant device in accordance with another embodiment of the present disclosure.

FIG. 10 illustrates another embodiment of a repellant device 400 that may include the repellant portion 10 and a light portion 12 discussed above. In embodiments, the light portion 12 may include a solar panel 404 that may be used to provide power to the repellant portion 10 and/or light portion or to recharge the power source 68 or another battery B. In embodiments, the repellant portion 10 and the light portion 12 may be mounted on a stake 14 that may be configured for insertion into the ground in the manner discussed above. In embodiments, the stake 14 may be configured to be removably inserted into the ground to allow for repositioning of the device 400. In embodiments, the repellant device 400 may be solar powered such that there is no need for connection to an external power source and no need for the wire W or the conduit or channel discussed above. In embodiments, the power source 68 may be a battery and may be provided in the battery fixture In embodiments, the stake 14 may not be used and the repellant portion 10 and the light portion 12 of the device 400 may be mounted on the stand 114 in a manner similar to that illustrated in FIGS. 1A and 1B, for example, or in a base that may be positioned as desired on virtually any surface. In embodiments, where the repellant device 400 uses the stand 114 (see FIGS. 1A and 1B, for example), the repellant portion 10 and the light portion 12 may be mounted in or on the stand rather than on the post 16. In embodiments, the repellant portion 10 and the light portion 12 of the device 400 may be mounted in or on a deck clip 214 in a manner similar to that illustrated in FIGS. 1C and 1D, for example).

In embodiments, the stake 14 may be connected to the post 16 via a first spring lock 15a as discussed above and the post 16 may be attached to a base 20 of the repellant portion 10 via the second spring lock 15b. Other securing devices may be used to connect the stake 14 to the post 16 and the post to the base 20, including but not limited to threads, screws, or a frictional connection, to name a few.

In embodiments, the cover 22 may be provided around the spring lock 15b connecting the post 16 and the base 20. In embodiments, another cover may be provided, if desired. In embodiments, the cover 22 may not be provided as noted above.

In embodiments, the repellant housing 26 may include a plurality of vent openings 26a, as discussed above, formed in a sidewall thereof as noted above. In embodiments, the vent openings 26a are sized to allow vaporized insect repellant material to exit the repellant housing 26 while preventing users from reaching inside the housing 26. In embodiments, the vent openings 26a may be 0.13 inches apart, however, this distance may be larger or smaller, as is noted above.

In embodiments, as discussed above, a heating assembly 28 may be mounted in the repellant housing 26. In embodiments, the heating assembly 28 may be the heating assembly discussed above. That is, the heating assembly 28 may include a heating element 28a mounted in a heating housing 28b of the heating assembly 28 as discussed above. In embodiments, the heating element 28a may be a ceramic heating element. In embodiments, ceramic heating elements offer certain benefits including quick heating, a high heat to size ratio and high energy efficiency. In embodiments, any suitable heating element may be used including an etched foil heater, a band heater or a tubular heater, to name a few. In embodiments, as noted above, a power terminal 28c may be provided in the heating housing 28b and may be electrically connected to the heating element 28a. In embodiments, the power terminal 28c may be electrically connected to the heating element 28a such that the heating element 28a generates heat. In embodiments, the power terminal 28c may be electrically connected to or implemented as a battery B that provides power to the heating element 28a. In embodiments, a battery fixture 10c may be provided to support the battery B. In embodiments, the battery B may take the place of the power source 68, in which case the power source 68 illustrated in FIG. 10 may not be included where indicated and the battery B may provide power to the heating element 28a, the light portion 12 and the control circuitry as well. In embodiments, the repellant cartridge 28d may be mounted in the heating housing 28b. In embodiments, the repellant cartridge 28d may hold insect repellant. In embodiments, the wick 28e may extend from a top of the cartridge 28d and may be positioned adjacent to the heating element 28a when the repellant cartridge 28d is mounted in the housing 28b. In embodiments, the repellant cartridge 28d may be removably mounted in the housing 28b. In embodiments, the cartridge 28d may be screwed into the housing 28b. In embodiments, the housing 28b may include an opening 28f configured to receive at least a top portion of the cartridge 28d such that the wick 28e is positioned adjacent to the heating element 28a when the top portion of the cartridge 28d is positioned in the opening 28f as can be seen in FIG. 2 for example. In embodiments, the cartridge 28d may be secured to the housing 28b is any desired manner. In embodiments, the insect repellant may be metofluthrin, however any suitable insect repellant may be used including transfluthrin or essential oils, to name a few. In embodiments, the wick 28e may draw repellant up out of the top of the cartridge 28a adjacent to the heating element 28a where heat from the heating element 28a vaporizes the repellant. The vaporized repellant may flow out through the openings 26a into the area around the repellant device 400 to create an insect free area around the device.

In embodiments, the heating assembly top 29 may be provided above the heating assembly 28, as discussed above. In embodiments, as noted above, the heating assembly top 29 may include the top disk 29a with the plurality of legs 29b extending downward therefrom spacing the disk 29a from the housing 28b to provide a space for vaporized repellant to fill prior to exiting through the openings 26a in a manner similar to that described above.

In embodiments, the device 400 may use the repellant housing 26 discussed above. In embodiments, the repellant housing 26 may be separated from the base 20 to allow access to the cartridge 28d in the manner illustrated in FIG. 7 and discussed above, for example. In embodiments, the housing 26 may be separated from the base 20 such that the cartridge 28d can be removed and replaced in the heating element housing 28b. In embodiments, the device 400 may include the pair of release elements 30a, 30b discussed above which may be provided in the base 20 to releasably connect the base to the housing 26. In embodiments, as noted above, each of the release elements 30a, 30b may include the buttons 30a1, 30b1 mounted in a respective casing 30a5, 30b5 (see FIG. 6, for example) in the base 20 that may be pushed inward to move a corresponding protrusion 30a2, 30b2 inward. The protrusions 30a2, 30b2 may be received in respective slots 30a3, 30b3 formed in the housing 26 to secure the base 20 to the housing 26 when the protrusions 30a2, 30b2 are in the slots 30a3, 30b3 and release the base from the housing when the protrusions are pushed inward as discussed above. In embodiments, the respective biasing spring 30a4, 30b4 biases the buttons 30a1, 30b1 and protrusions 30a2, 30b2 outward and into the slots 30a3, 30b3 to hold the housing 26 on the base 20 as previously explained above. When a user pushes the buttons 30a1, 30b1 inward, the protrusions 30a2 and 30b2 are removed from the slots 30a3, 30a3 to allow the housing 26 to be removed from the base 20, as noted above. Once removed, the cartridge 28d may be removed from the repellant housing 28b and replaced with a new cartridge, if desired in a manner similar to that discussed above.

In embodiments, the device 20 may use the light portion 12 discussed above. In embodiments, the light portion 12 may be mounted on top of the repellant portion 10 as generally shown in FIG. 10. In embodiments, the screen element 50, may be mounted on top of the housing 26 and extends around a periphery of the light portion 12 in a manner similar to that discussed above. In embodiments, as noted above, the screen element 50 may be substantially transparent. In embodiments, the screen element 50 may be substantially waterproof, or water resistance and may be used to protect the light emitting assembly 60 (see FIG. 1, for example) provided inside the screen element 50, which may also be included in the device 400.

In embodiments, the light emitting assembly 60 of FIGS. 2 and 3 may be used in the device 400 and may include the cylindrical shade 62 surrounding a light emitting element 64 in a manner similar to that discussed above. In embodiments, the light emitting element 64 may include a plurality of light sources 66A1, 66A2. In embodiments, the light sources are LEDs 66A1, 66A2 that may emit light through the shade 62 (FIG. 3) which may be tinted or colored to provide the impression of a flame. In embodiments, one or more of the LEDs 66A1, 66A2 may be a different color in order to provide the impression of a flame. As noted above, in embodiments, the LEDs 66A1 belong to a first group and the LEDs 66A2 belong to a second group. In embodiments, as noted above, the first group of the LEDs 66A1 may be driven to blink on and off together and the second group of LEDs 66A2 may be driven to brighten and dim in intensity together. In embodiments, the second group of LEDs 66A2 may be positioned below the first group of LEDs 66A1 or vice versa. In embodiments, as discussed above, one or more of the light emitting diodes in the first group of LEDs 66A1 or the second group 66A2 may be of different colors. The combination of the two groups of LEDs, when viewed through shade 62, in embodiments, which may be tinted or colored as noted above, if desired, provides the impression of a flickering flame behind the screen 50 as described above. In embodiments, as noted above, shade 62 may be of any desired shape provided that it fits within the screen 50. In embodiments, while LEDs are preferred, other light sources may be used.

In embodiments, the light emitting assembly 60 may be used in device 400 and may provide constant, that is, non-flickering light. In embodiments, additional constant light sources 66B, discussed above, may be used to provide a constant light rather than the flickering effect discussed above. In embodiments, the light sources 66B may be of the same color and evenly spaced around the substrate 42. In embodiments, the light sources 66B may be activated together and remain on at the same time to provide for a constant light that does not flicker. In embodiments, the light sources 66B may be white light LEDs. In embodiments, when the light sources 66B are activated, the light sources 66A1, 66A2 are not activated such that the light portion 60 may operate in a constant light mode or a flickering mode. In embodiments, as noted above, the LEDs 66A1, 66A2 may be used to provide constant light by simply being operated in an alternate state in which they do not blink on and off or dim. In embodiments, where the LEDs 66A1, 66A2 may be used to provide constant light, it may not be necessary to provide the light sources 66B. In embodiments, device 400 may include additional constant light sources, for example, white light LEDs that may be operated to provide constant light, without flickering, if desired. In embodiments, one or more of the LEDs in the first group of LEDs 66A1 and/or the second group of LEDs 66A2 may be operated in a constant manner to provide constant light without flickering as discussed above.

In embodiments, the circuit board 74 may be provided in the device 400 to hold or provide control circuitry, or a control circuit for the lighting portion 12 and the repellant portion 10. In embodiments, a power source 68, which may be a battery, may be operatively connected to the PCB 74 and used to power the repellant portion 10 and the light portion 12. In embodiments, a second battery B may be provided and connected to the heating element 28a, via or as the power terminal 28c, as noted above, to provide power to activate the heating element and/or to replace the power source 68. In embodiments, the heating element 28a may be powered by the power source 68 without using the battery B. In embodiments, the battery B may be used to power both the lighting portion 12 and the repellant portion 10 which would make the power source 68 unnecessary. In embodiments, the heating element 28a may be controlled by the control circuit provided on the circuit board 74. In embodiments, the power source 68 may be provided on the circuit board 74. In embodiments, the power source 68 may be mounted on the base 70 as indicated in FIG. 2, for example. In embodiments, the power source 68 may be a battery. In embodiments, the power source may be a rechargeable battery 68. In embodiments, the battery may be recharged via any other suitable power source. In embodiments, the device 400 may include a cap 402 and a solar panel 404 may be mounted thereon and electrically connected to the power source 68 (which may be a battery) and/or the battery B to recharge them. In embodiments, the circuit board 74 may include recharging circuitry connected to the solar panel and the power source 68 or battery B to control recharging. In embodiments, the power source 68 may be used to provide one or more desired voltages to the light portion 12 and repellant portion 10. In embodiments, the cap 402 may also include a photodector or other light sensing element 406 which may be used to detect an ambient light level around the device 400 wherein activation of the light portion 12 may be based on the ambient light level. In embodiments, the photodector 406 may provide ambient light information to the control circuit 74a and the control circuit 74a may control the light portion 12 and/or the repellant portion 10 based on the ambient light information, for example, to turn the light portion 12 off when the light level is above a threshold level.

As noted above, in embodiments, the power source 68 may be a battery. In embodiments, the battery may be a rechargeable battery. In embodiments, the battery may be a replaceable battery. In embodiments, the battery may be removable battery. In embodiments, the battery may provide power to the heating element 28a, the flickering LEDs 66A1, 66A2 and LEDs 66B as well as the control circuit 74a. In embodiments, the battery may also provide power to the control circuitry, or control circuit, 74a, which may be provided on the PCB 74 and may be or include the boost circuit, and/or other circuitry, may drive the flickering LEDs 66A1, 66A2 and LEDs 66B. In embodiments, a solar panel 404 (see FIG. 10) may be operatively connected to both the power source 68 (battery) and may be use to recharge it. In embodiments, the solar panel 404 may provide power directly to the heating element 28a, the flickering LEDs 66A1, 66A2 and LEDS 66B as well as the control circuit 74a. In embodiments, the battery B may be used instead of the power source 68. In embodiments, the power source 68 may be a battery and may be used in place of the battery B. The control circuitry 74a may also control activation of the repellant portion 10, specifically activation of the heating element 28a to vaporize insect repellant. As noted above, the flickering LEDs 66A1, 66A2 may be driven in respective patterns to simulate the appearance of a flickering flame and the LEDs 66B may be activated to provide constant light when desired. In embodiments, the control circuitry 74a may be connected to the input device 80 (of FIG. 1, for example) such as a power button and may drive the repellant portion 10, the flickering LEDs 66A1, 66A2 or constant light LEDs 66B based on input provided by the input device 80. In embodiments, separate control circuitry may be provided and connected to the power button 80 to control the repellant portion 10, the flickering LEDs 66A1, 66A2 and LEDs 66B. In embodiments, the light level information provided by the light sensor may be provided to the control circuitry 74a. In embodiments, the control circuitry 74a may include a processor, microprocessor or other control element or component to provide for control of the repellant portion 10, the flickering LEDs 66A1, 66A2 and LEDs 66B. In embodiments, control of the repellant portion 10, the flickering LEDs 66A1, 66A2 and LEDs 66B may be based on both input from the power button 80 and the light sensor. In embodiments, the power button 80 may be pressed once, or placed in a first position, to enter a light monitoring mode in which power is provided to one or more of the repellant portion 10, the flickering LEDs 66A1, 66A2 and LEDs 66B when the light information indicates a light level below a threshold based on input form the sensor. In embodiments, one or more of the repellant portion 10, the flickering LEDs 66A1, 66A2 and LEDs 66B may be deactivated when the light level rises above the threshold. In embodiments, pushing the button 80 again, or putting it in a second position, may directly activate one or more of the repellant portion 10, the flickering LEDs 66A1, 66A2 and LEDs 66B without consideration of the light level information. In embodiments, as noted above, each of the repellant portion 10, the flickering LEDs 66A1, 66A2 and LEDs 66B may be activated independently, if desired, based on operation of, or the position of, the power button 80 and/or light level information provided by the light sensor. In embodiments, as noted above, other input elements may provide information to control the repellant portion 10, the flickering LEDs 66A1, 66A2 and LEDs 66B. In embodiments, the repellant device 100 may be placed in an off mode in which all of the repellant portion 10, the flickering LEDs 66A1, 66A2 and LEDs 66B are deactivated and stay that way regardless of light sensor information until activation of the power button 80 or another input.

Figure 11:
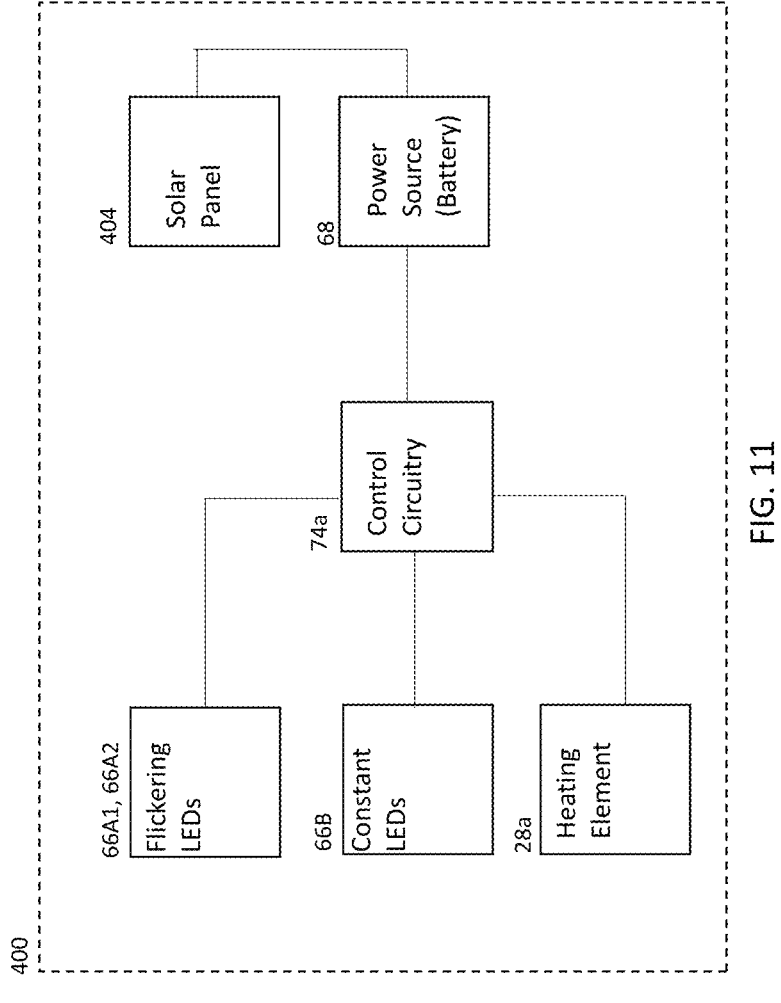
FIG. 11 illustrates an exemplary block diagram of the insect repellant device of FIG. 10 in accordance with an embodiment of the present disclosure.

FIG. 11 illustrates an exemplary block diagram of the repellant device 400 of FIG. 10 in which a solar panel 404 is provided on a top surface of the device. As noted above, the solar panel 404 may recharge the power source 68 (battery) or to directly power the heating element 28a, the flickering LEDs 66A1, 66A2 and LEDs 66B as well as the control circuit 74a.

One advantage of the repellant devices 100, 200, 400 is that they repel insects by providing a substantially pest free area around the device including a cloud of vaporized repellant while also provide an aesthetically pleasing light source that provides reliable light and is not subject to environmental conditions. The use of a battery and or solar panels allows for use of the repellant devices 100, 200, 400 virtually anywhere.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. An insect repellant device comprising:
a repellant portion including an insect repellant and configured to disperse vaporized insect repellant around the insect repellant device;
a light portion mounted on top of the repellant portion, the light portion including a plurality of flickering light sources configured to simulate a flame,
wherein the plurality of flickering light sources include:
a first group of flickering light sources operating in a first pattern; and
a second group of flickering light sources operating in a second pattern; and
a control circuit operably connected to the repellant portion and the light portion to control activation of the repellant portion to provide vaporized insect repellant and the plurality of flickering light sources to provide light.

2. The insect repellant device of claim 1, further comprising a power source operably connected to one or more of the control circuit, the light portion and the repellant portion.

3. The insect repellant device of claim 2, wherein the repellant portion includes:

a repellant housing;

a heating element mounted in the repellant housing;

an insect repellant cartridge including insect repellant mounted in the repellant housing, the insect repelling cartridge including:

a top portion configured to be received in an opening formed in the repellant housing; and a wick extending above the top portion and in contact with the insect repellant, wherein a top of the wick is positioned adjacent to the heating element.

4. The insect repellant device of claim 2, wherein the power source is a rechargeable battery.

5. The insect repellant device of claim 1, wherein the light portion includes at least one constant light source configured to provide substantially constant light.

6. The insect repellant device of claim 5, wherein the control circuit is operably connected to the plurality of flickering light sources and the at least one constant light source to activate the flickering light sources to simulate the flame while the constant light source is off.

7. The insect repellant device of claim 5, wherein the control circuit is operably connected to the flickering light sources and the at least one constant light source to activate the constant light source to provide constant light while the plurality of flickering light sources are off.

8. The insect repellant device of claim 2, wherein the power source is electrically connected to the heating element.

9. The insect repellant device of claim 2, wherein the power source is a rechargeable battery.

10. The insect repellant device of claim 2, further comprising a solar panel electrically connected to at least one of the power source, the repellant portion and the light portion.

11. An insect repellant device comprising:

a stand;

a post extending upward from the stand;

a repellant portion including an insect repellant and configured to disperse vaporized insect repellant around the insect repellant device;

a light portion mounted on top of the repellant portion, the light portion including a plurality of flickering light sources configured to simulate a flame, where the plurality of flickering light sources include:

a first group of flickering light sources operating in a first pattern;

a second group of flickering light sources operating in a second pattern;

a control circuit operably connected to the repellant portion and the light portion to control activation of the repellant portion to provide vaporized insect repellant and the plurality of flickering light sources to provide light.

12. The insect repellant device of claim 11, further comprising a power source electrically connected to the control circuit, the light portion and the repellant portion.

13. The insect repellant device of claim 12, wherein the power source is a battery.

14. The insect repellant device of claim 11, wherein the light portion further comprises at least one constant light source configured to provide substantially constant light.

15. The insect repellant device of claim 14, the control circuit is operably connected to the plurality of flickering light sources and the at least one constant light source to activate the flickering light sources to simulate the flame while the constant light source is off.

16. The insect repellant device of claim 14, wherein the control circuit is operably connected to the flickering light sources and the at least one constant light source to activate the constant light source to provide constant light while the plurality of flickering light sources are off.

17. The insect repellant device of claim 11, wherein the repellant portion includes:

a repellant housing;

a heating element mounted in the repellant housing;

an insect repellent cartridge including insect repellant mounted in the repellant housing, the insect repelling cartridge including:

a top portion configured to be received in an opening formed in the repellant housing; and a wick extending above the top portion and in contact with the insect repellant, wherein a top of the wick is positioned adjacent to the heating element.

18. The insect repellant device of claim 12, wherein the power source is a rechargeable battery.

19. An insect repellant device comprises:

a deck clip;

a post extending upward from the deck clip;

a repellant portion including an insect repellant and configured to disperse vaporized insect repellant around the insect repellant device;

a light portion mounted on top of the repellant portion, the light portion including a plurality of flickering light sources configured to simulate a flame, where the plurality of flickering light sources include:

a first group of flickering light sources operating in a first pattern; and a second group of flickering light sources operating in a second pattern; and a control circuit operably connected to the repellant portion and the light portion to control activation of the repellant portion to provide vaporized insect repellant and the plurality of flickering light sources to provide light.

20. The insect repellant device of claim 19, further comprising a power source connected to one or more of the control circuit, the light portion and the repellant portion.

\* \* \* \* \*